United States Patent [19]
Stieb et al.

[11] Patent Number: 5,653,559
[45] Date of Patent: Aug. 5, 1997

[54] UNDERGROUND HOUSING FOR TELECOMMUNICATION DEVICE

[75] Inventors: Werner Stieb, Stadthagen; Wolfgang Wenski, Rinteln; Hans-Holger Freckmann, Langenhagen; Zbigniew Wielgolaski; Günter Kochsmeier, both of Stadthagen; Eberhard Gerwald, Giesen; Heinz Wangerin, Obernkirchen; Franz Grajewski, Stadthagen, all of Germany

[73] Assignees: kabelmetal electro GmbH; KE Kommunikations-Electronik GmbH & Co., both of Germany

[21] Appl. No.: 379,399

[22] Filed: Jan. 26, 1995

[30] Foreign Application Priority Data

Feb. 9, 1994 [DE] Germany ............... 9402158 U
Jul. 6, 1994 [DE] Germany ............... 9410777 U

[51] Int. Cl.⁶ .................. B65D 21/00; B65D 90/10
[52] U.S. Cl. .................. 405/363; 52/20; 206/514; 220/23.83; 220/484
[58] Field of Search ............... 405/303; 174/37, 174/39; 52/169.6, 19, 20; 206/514; 220/23.83, 484

[56] References Cited

U.S. PATENT DOCUMENTS

| | | | |
|---|---|---|---|
| 2,247,936 | 7/1941 | Bishop | 174/37 X |
| 3,377,487 | 4/1968 | McNulty | 174/37 X |
| 3,482,108 | 12/1969 | Steinmayer | 174/37 X |
| 3,503,025 | 3/1970 | Weinfurt | 174/37 X |
| 3,672,103 | 6/1972 | Kost | 52/169.6 X |

FOREIGN PATENT DOCUMENTS

| | | | |
|---|---|---|---|
| 873579 | 6/1971 | Canada | 174/37 |
| 2693320 | 1/1994 | France | 174/37 |
| 1949694 | 9/1979 | Germany | 174/37 |
| 3322584 | 11/1983 | Germany . | |

Primary Examiner—Tamara L. Graysay
Assistant Examiner—Tara L. Mayo
Attorney, Agent, or Firm—Ware, Fressola, Van Der Sluys & Adolphson LLP

[57] ABSTRACT

In an underground configuration housing for telecommunication devices, a mechanically stable housing, which is closed by a removable cover, has an installation located inside which supports at least one telecommunication device. The installation supporting the telecommunication devices is a pot-shaped container with a cylindrical insert positioned therein so as to form a gap therebetween. The container is sealed in water-proof fashion by a removable cover and the telecommunication devices are located inside of the cylindrical insert.

24 Claims, 6 Drawing Sheets

5,653,559

UNDERGROUND HOUSING FOR TELECOMMUNICATION DEVICE

BACKGROUND OF THE INVENTION

1. Technical Field

The invention relates to an underground housing for telecommunication devices, e.g., electronic units, and, more particularly, to a mechanically stable housing which is closed by a removable cover and has at least one telecommunication device located inside.

2. Description of the Prior Art

Cable networks in telecommunications require circuit and safety installations for different applications. Thus, cable distribution housings for telecommunications are known and protective housings are also known for cable television and for remote control installations in street signal arrangements. However, most of these above ground housings are mounted on pedestals. They often present obstacles on sidewalks and are visually unappealing. In addition, there is a high probability that they will be damaged by vehicles, with the possibility that the telecommunication devices inside the housings will also be damaged and thus be unable to perform their tasks.

A subterranean housing is known from DE-PS 33 22 584, which comprises a shaft with a removable cover located inside the ground. The telecommunication installations are placed inside the shaft. The telecommunication installations are mounted on a pivoting wall, which is tilted into a vertical position during mounting operations. According to an alternative, a waterproof housing is placed in the shaft to receive installations that are sensitive to humidity. The waterproof housing pivots around a point of rotation and can be tilted out of the shaft.

SUMMARY OF THE INVENTION

An object of the present invention is to provide an underground container, which is particularly well suited for electronic units, i.e., for installations of the optical fiber transmission technology, and is easy to access and service. The sensitive electronic units are protected in the container against damage from heat and humidity.

This object is fulfilled by supporting the telecommunication devices in a pot-shaped container with a cylindrical insert located in a gap in the pot-shaped container. The container is humidity-proof when closed with a removable cover and the telecommunication devices are arranged in the cylindrical insert.

A significant advantage of the invention is that static mounting and water-proof sealing are separated in the underground container. While the static mounting is provided by the mechanically stable housing, which preferably is a concrete shaft, the sealing is provided by the closeable pot-shaped container.

Another significant advantage is that the gap between the pot-shaped container and the cylindrical insert serves as a guide and storage container for the cables entering from below. Since the sensitive parts are located inside the cylindrical insert, they are protected against the formation of condensation. Because of the heat dissipation of the units, the temperature inside the insert is always higher than the temperature of the external wall of the container, i.e. condensation can only form on the external wall of the container.

The invention will be fully understood when reference is made to the following detailed description taken in conjunction with the accompanying drawings.

DETAILED DESCRIPTION OF THE INVENTION

Figure 1:
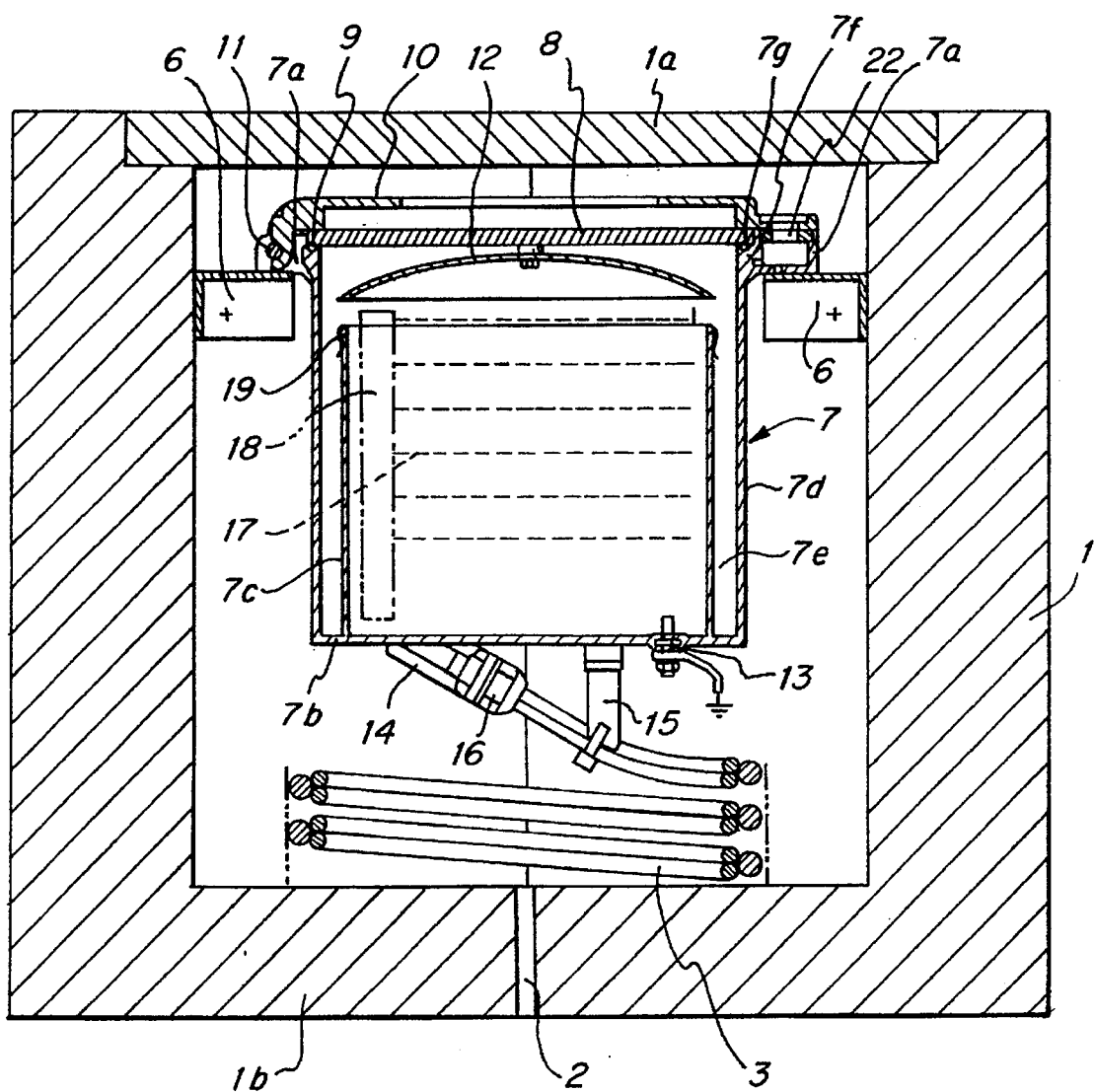
FIG. 1 is a vertical cross-sectional view of the underground container according to the invention.

Referring to FIG. 1, an underground container according to the invention includes a mechanically stable housing 1 in the form of a concrete shaft sunk into the ground under a sidewalk. The concrete shaft 1 can have a circular cross-section made of rings or a square cross-section made of plates. The bottom 1b of the shaft 1 contains a drain opening 2 to eliminate any water that could possibly collect. The wall of the concrete shaft 1 contains a not illustrated cable inlet opening, through which the cable 3 enters into the shaft 1 without tension and in humidity-proof manner. Other corresponding cable inlet openings may be provided if more cables are to be inserted into the shaft 1. The cables 3 are preferably attached to the cable inlet openings with well known cable feed-throughs 16 combined with a strain relief.

Supports 6 are provided in the wall areas of the concrete shaft 1 to support an inner container 7. A cover 1a made of cast iron closes the shaft 1 against water ingress. The container 7 rests on the supports 6 by means of brackets 7a, to which the container is bolted in a not illustrated manner.

The container 7 comprises a pot-shaped plastic part with a bottom 7b and a cylindrical insert or member 7c. An annular gap 7e is formed between the cylindrical insert 7c and the external wall 7d of the pot-shaped plastic part. The upper edge of the plastic part contains a peripheral bead 7f with a peripheral groove 7g. The container 7, i.e. the bottom 7b, the cylindrical insert 7c, the external wall 7d and the bead 7f form a unit, which is manufactured to advantage by injection molding a suitable plastic.

The end of container 7 is formed by a cover 8, preferably of plastic, which rests on the bead 7f and closes the opening of the container 7 in a water-proof manner by means of a seal 9 located in groove 7g. In the closed condition, a locking ring 10 exerts a steady pressure on cover 8 and seal 9. To that end, the locking ring 10 can pivot around a bearing 11. Once in its tilted, nonsealing position (not shown), the locking ring 10 can be removed from the bearing 11. The free end of the locking ring 10 is bolted to the container at 22. Since the locking ring 10 must exert a force on the seal 9, it must be torsion-proof against the required forces. The material of the locking ring 10 is preferably a fiber-reinforced plastic, e.g. a glass-fiber-reinforced polyamide. The locking ring 10 has the additional task of protecting the container 7 against unauthorized access. To that effect, a lock (not shown) is provided in the area 22, which can only be closed when the bolts of locking ring 10 are fully tightened. It is advantageous for an optimum seal if the locking ring 10 and container 7 are bolted in various places, preferably in the area of brackets 7a. A uniform load is provided around the circumference of seal 9 when all the bolts are fully tightened, while simultaneously unloading the lock.

An arched screen 12 is provided on the underside of cover 8, which catches any condensate dripping from the cover 8 and guides it to the annular gap 7e.

The bottom 7b of container 7 also contains a metal bushing 13, which is connected in a not illustrated manner to a metal bushing in the wall of the concrete shaft 1 and to a grounding rod.

Furthermore, the bottom 7b of container 7 has several cable inlet guides 14, through which the cables enter the inside of container 7 in a water-proof manner. Cable clamps 15 attached to the container bottom 7b affix the cable and provide the functions of sealing and clamping. The seal is achieved by means of well known cable feed-throughs 16 combined with a strain relief or by well known shrinkable tubing.

The invention preferably uses electronic units as the telecommunication devices. The units are arranged on unit carriers 17. The unit carriers 17 are attached to a holder 18. Springs 19 affix the holder 18 and the unit carriers 17 to the upper rim of the cylindrical insert 7c, from where they can be removed.

The telecommunication devices are particularly those which convert light signals routed through optical fiber cables into electrical signals, i.e. the incoming cables are optical cables while the outgoing cables are conventional copper cables. A supply cable provides energy to the electronic units. These cables can also be combined in a suitable manner into a hybrid cable.

The annular gap 7e contains a long enough supply of cable, so that the holder 18 and the unit carrier 17 can be removed and reinserted for installation purposes, after the cover 8 has been opened.

To better dissipate the heat produced by the units, it is advantageous if the cover 8 is made of metal and contains not illustrated cooling ribs.

Figure 2:
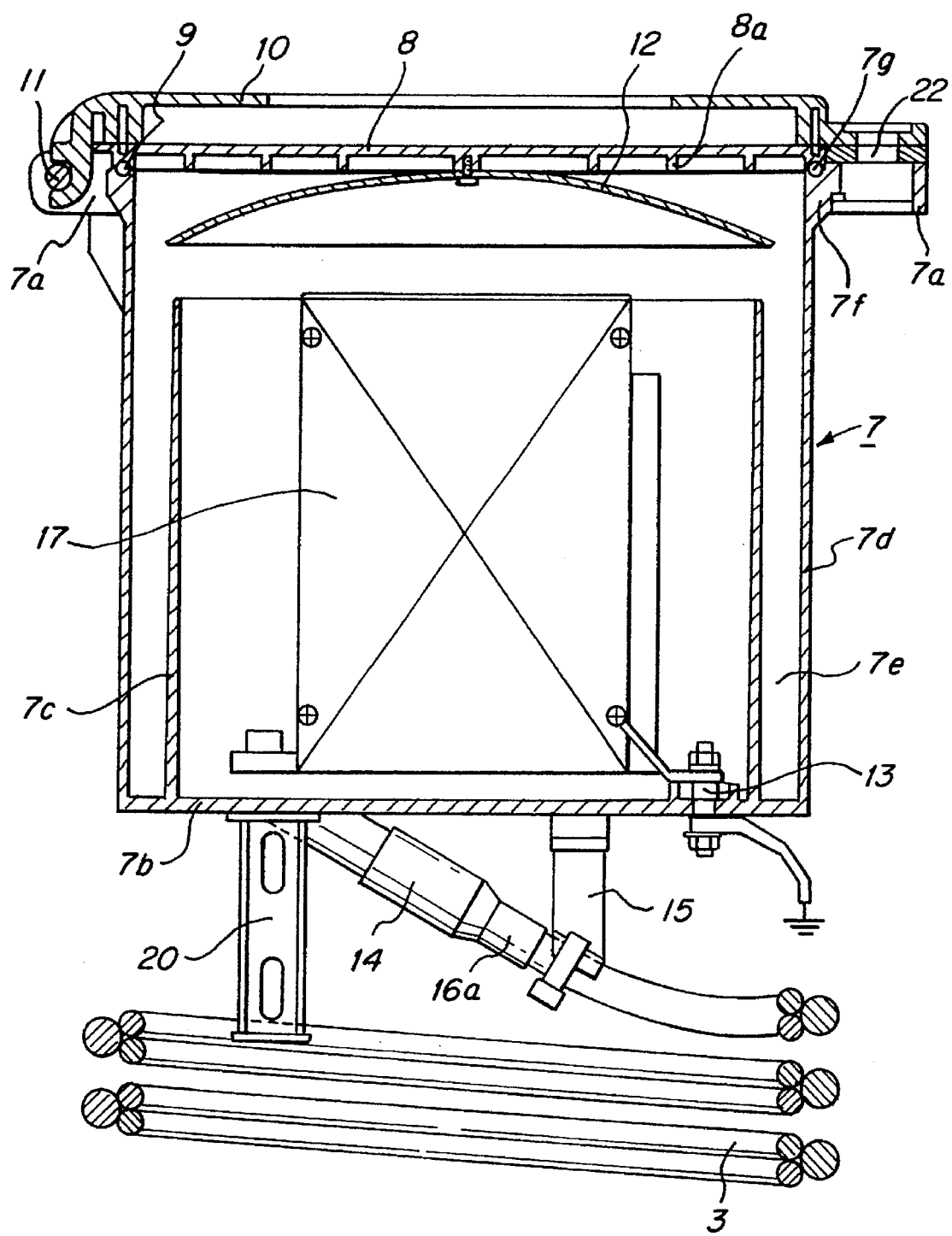
FIG. 2 is a vertical cross-sectional view of a second embodiment of the inner container of the present invention.

FIG. 2 illustrates another embodiment of the inner container 7. The seal of the inserted cables 3 differs from the container shown in FIG. 1. A shrinkable tube 16a is depicted in this instance. The cover 8 has a number of reinforcing ribs 8a, which lead to savings in material. The unit carrier 17 hangs over the upper rim of the cylindrical insert 7c. The not illustrated plates containing the electronic units and the circuits can be inserted into the unit carrier 17.

The container 7 can be lifted and removed from the concrete shaft 1 for installation work. At least three supporting feet 20 are provided, of which only one is illustrated for reasons of clarity.

Figure 3:
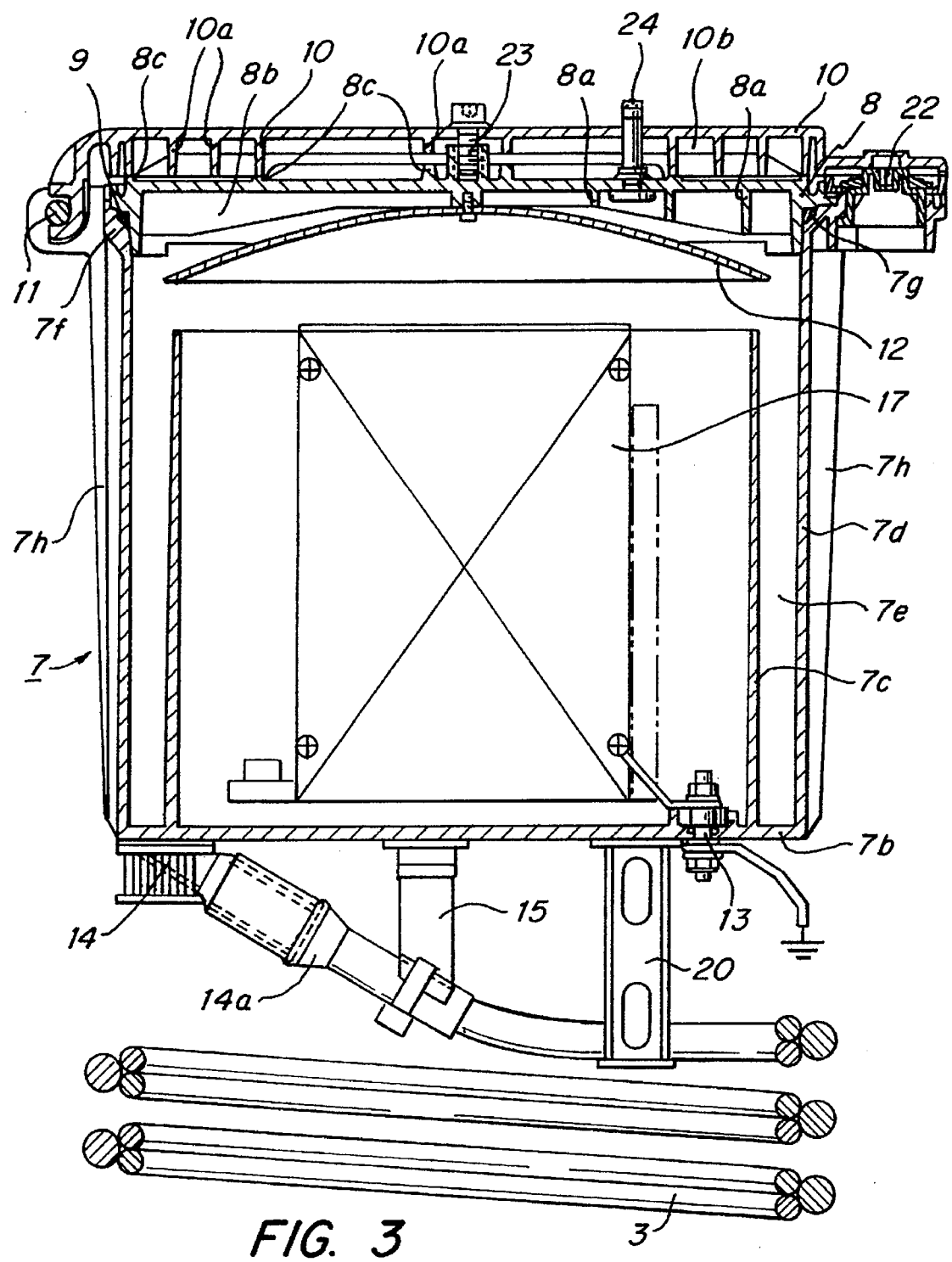
FIG. 3 is a vertical cross-sectional view of a third embodiment of the inner container of the present invention.

FIG. 3 depicts yet another alternative embodiment of container 7. The container 7 is a pot-shaped injection-molded plastic part, preferably made of polypropylene. The upper rim of the injection-molded part contains a peripheral bead 7f with a bevel 7g. The external wall contains several uniformly distributed ribs 7h running in the longitudinal direction, whose height decreases towards the bottom 7b.

The container 7 is closed by a cover 8, which rests on the bead 7f and seals the opening of container 7 against liquids and gas by means of a seal 9 inserted into bevel 7g.

Both the cover 8 and the locking ring 10 are made of injection-molded plastic, where polypropylene is preferred for the cover 8 and polyamide for the locking ring 10.

The grounded metal bushing 13 is conductively connected to the telecommunication devices 17.

The cables 3 needed to supply the telecommunication devices 17 enter the inside of the container through the cable inlet guide 14, i.e. not the cables 3 themselves, but the conductors from which the cable jacket has been removed, which are stored in the annular gap 7e. The seal of the inlet guide 14 against the cable 3 is provided by a shrinkable tubing 14a. The cable 3 is held in place by the cable clamp 15 attached to the container bottom 7b. If it is necessary to work on the telecommunication units 17, the locking bolts 22 are loosened and the locking ring 10 and cover 8 are removed. The units 17 can then be removed with the stored conductors being also taken out of the annular gap 7e.

An essential requirement of the container 7 is to be sealed against water penetration after its installation. To that end, an internal test pressure of 0.02 to 0.5 bar, preferably 0.1 bar, is specified after the assembly of container 7. In the well known manner, the seam between container 7 and the cover system is then sprayed with a soap mixture and tested for the formation of bubbles by means of a gas detector.

The inside surface of the cover is reinforced with concentric ribs 8a and radial ribs 8b, so that the cover 8 can withstand this pressure. In addition, further ribs 8c are provided on the outside surface of the cover 8.

In the same way, concentric ribs 10a and radial ribs 10b are provided on the locking ring 10. The locking ring 10 and the cover 8 are screwed together by a screw bolt 23, thus forming a unit wherein the ribs 10a and 10b protect the cover 8 against deformation. A valve 24 is inserted in a pressure-proof manner into the cover 8, to establish the test pressure inside of the container.

The height of the concentric ribs 10a provided in the locking ring 10 decreases by 0.1 mm each towards the center. This permits, when the cover 8 and the locking ring 10 are locked together, the pressure of ribs 10a to be uniformly distributed over the cover 8, even if the cover 8 bends, as the innermost rib does not transfer the highest pressure.

The screw bolt 23 is inserted into the cover 8 through a not illustrated threaded insert.

Figure 4:
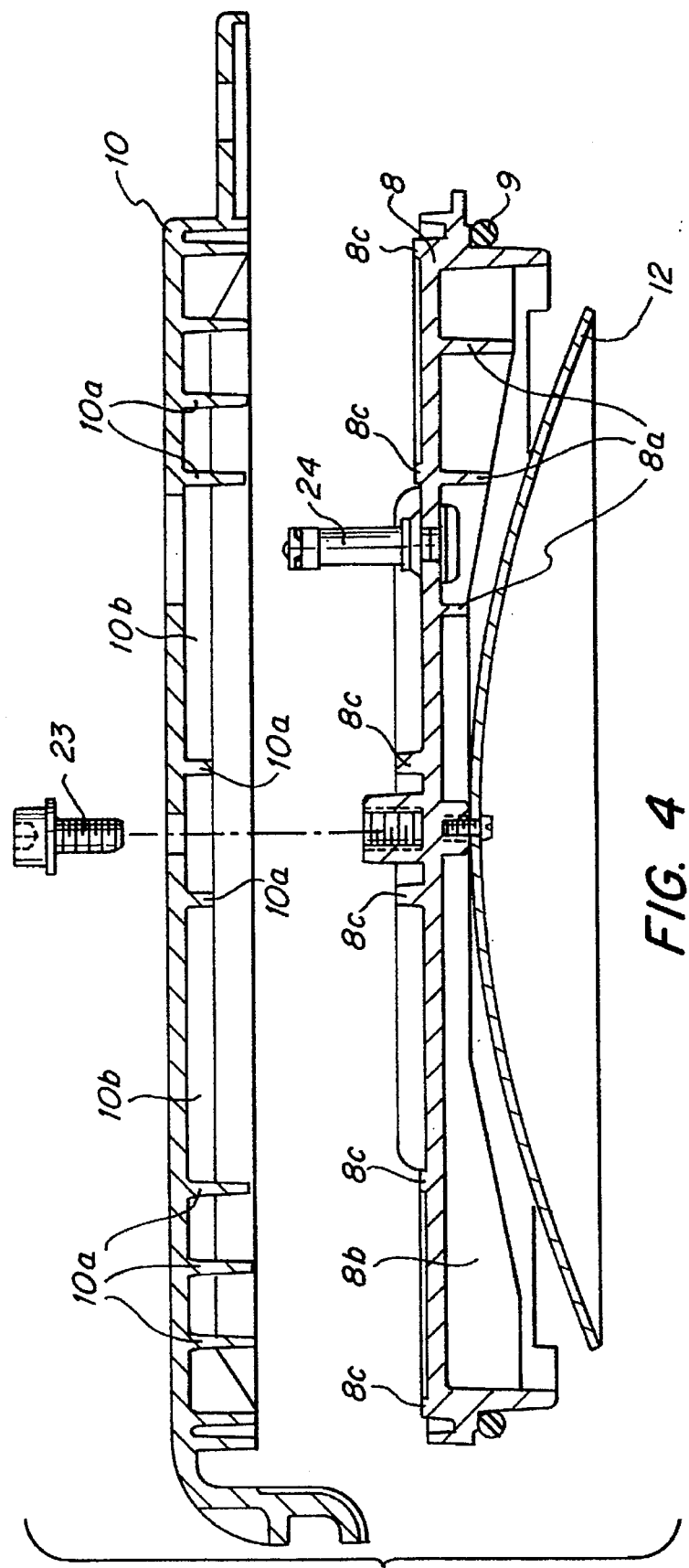
FIG. 4 is an exploded cross-sectional view of the cover and locking ring of the FIG. 3 embodiment.
Figure 5:
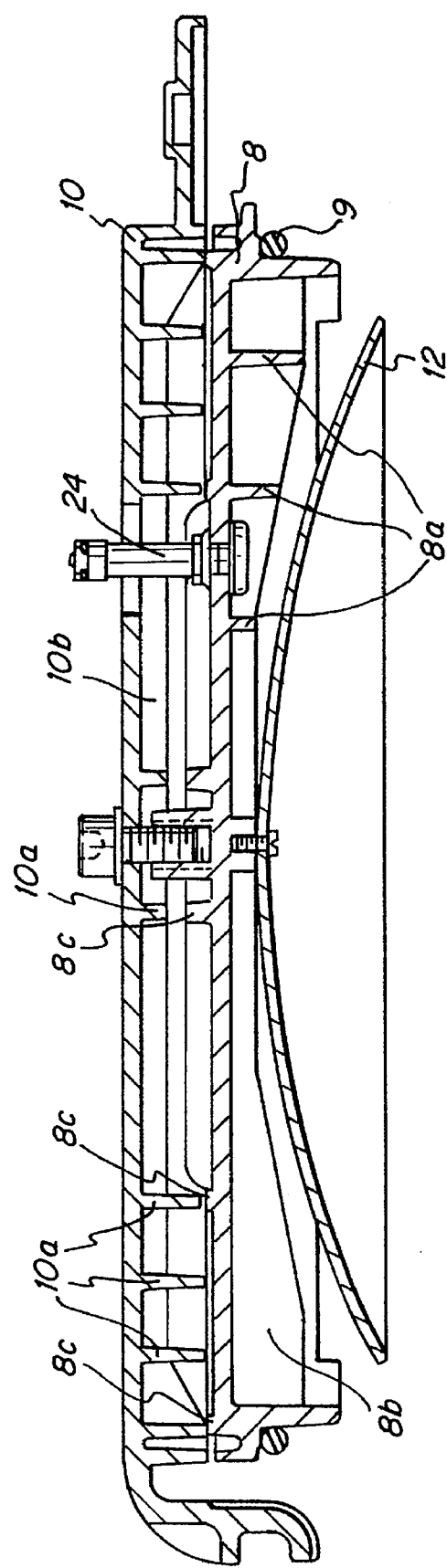
FIG. 5 is a cross-sectional view of the cover and locking ring of FIG. 4 mounted to one another.

FIG. 4 illustrates the cover 8 and the locking ring 10 of FIG. 3 in the still unmounted condition. FIG. 5 is similar to FIG. 4 but shows the cover 8 and locking ring 10 mounted to each other.

Figure 6:
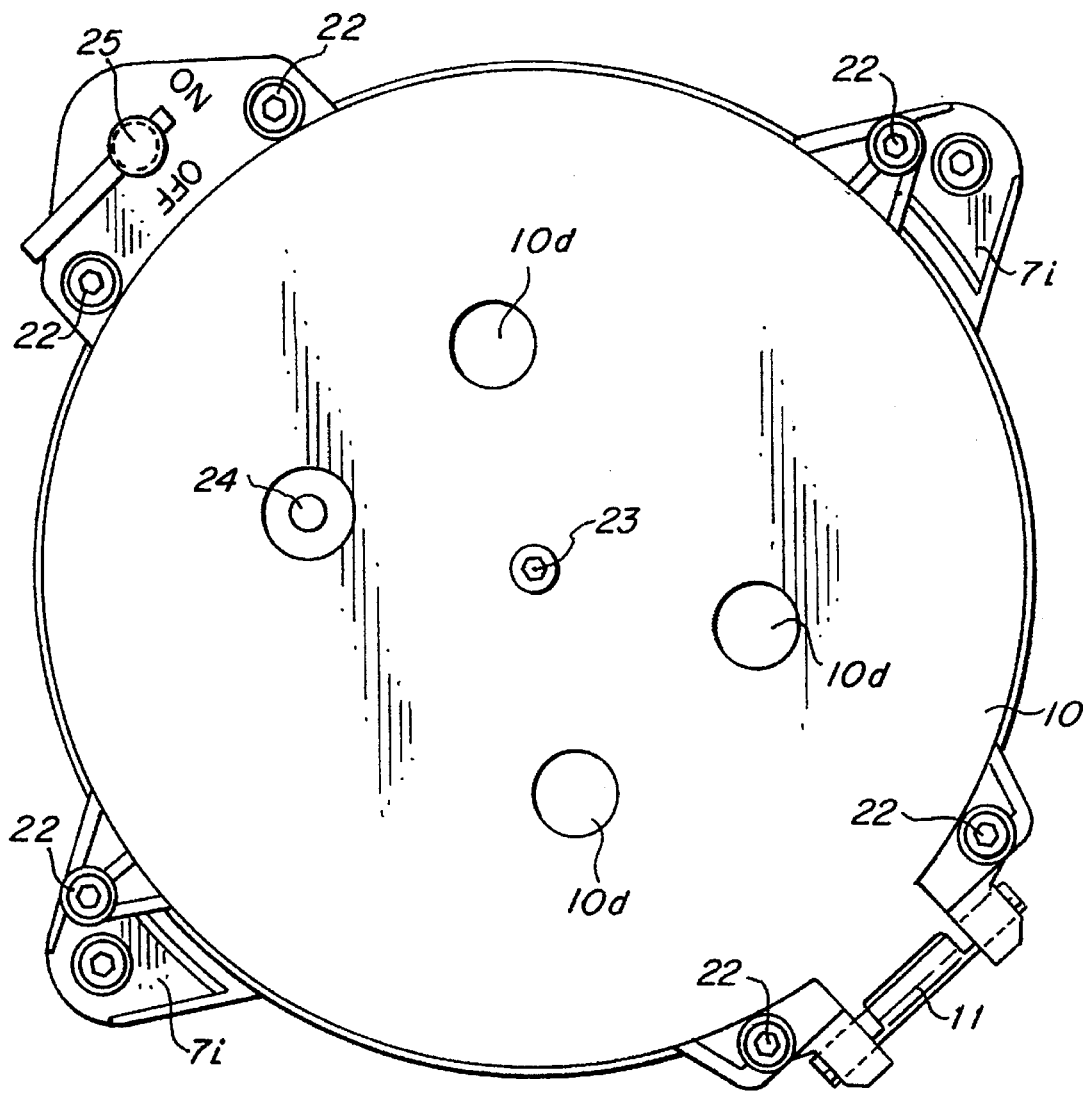
FIG. 6 is a top plan view of the cover and locking ring of FIG. 5 installed on their inner container.

FIG. 6 is a top view of the locking ring 10. Here the brackets formed on the container 7 are numbered 7i, and are used to suspend the container 7 in the underground container where it can be securely bolted.

The locking ring 10 has openings 10d to provide good air circulation, thereby improving the dissipation of heat. In addition, these openings 10d allow the valve 24 to pass through the locking ring 10, where it is accessible from the outside. The openings 10d also permit the user to grasp the locking ring 10 during the opening process.

The locking ring 10 is bolted to the container 7 in several places, so as to exert a uniform pressure on the cover 8 and thereby on the sealing ring 9. The screw bolts 22 are located in the area of bearing 11, as well as on the opposite side in the lock area and in the area of brackets 7i. The locking element is a turning handle 25, which can be equipped with a lock (not shown) in a well known manner.

The preferred embodiments described above admirably achieve the objects of the invention; however, it will be appreciated that departures can be made by those skilled in the art without departing from the spirit and scope of the invention which is limited only by the following claims.

What is claimed is:

1. Housing for use in an underground configuration for telecommunication devices, the housing comprising:

(a) a mechanically stable housing having a side wall with an integrally formed bottom wall and a removable cover;

(b) a device located inside the mechanically stable housing for supporting at least one telecommunication device, the device supporting the at least one telecommunication device is an injection-molded plastic pot-shaped container with a generally cylindrical side wall and a closed bottom wall, the pot-shaped container having a cylindrical member located therein, whereby a gap is formed between the pot-shaped container and the cylindrical member;

(c) a removable container cover on the pot-shaped container whereby the container is made waterproof; and (d) at least one telecommunication device located in the cylindrical member.

2. Housing as claimed in claim 1, wherein the mechanically stable housing is a concrete shaft and its removable cover is a cast iron cover.

3. Housing as claimed in claim 1, wherein the mechanically stable housing is provided with at least one drainage opening in the integrally formed bottom wall.

4. Housing as claimed in claim 1, wherein the container is cylindrical whereby the gap between the container and the cylindrical member is an annular gap.

5. Housing as claimed in claim 1, further comprising cable inlet guides provided in the closed bottom wall of the container to permit cables to be inserted into the gap in a pressure-proof manner.

6. Housing as claimed in claim 1, further comprising a cable clamp attached to the closed bottom wall of the container.

7. Housing as claimed in claim 1, further comprising a metal bushing provided in the closed bottom wall of the container and connected in an electrically conducting manner to a metal bushing in the mechanically stable housing whereby all electrically conducting parts located inside the container can be electrically connected to the metal bushings for grounding purposes.

8. Housing as claimed in claim 1, wherein the container is closed by a cover system comprising the container cover, a locking ring and a sealing ring.

9. Housing as claimed in claim 8, wherein the sealing ring is in a groove located in an upper rim of the container.

10. Housing as claimed in claim 8, wherein the locking ring is pivotally mounted on a bearing on one side of the container and is bolted to the container on an opposite side of the container, whereby the locking ring exerts pressure on the container cover which in turn exerts pressure on the sealing ring.

11. Housing as claimed in claim 8, wherein the cover system is bolted to an upper edge of the container in several places distributed around a circumference of the container.

12. Housing as claimed in claim 1, further comprising at least three brackets formed on an upper rim of the container and resting on supports from the mechanically stable housing.

13. Housing as claimed in claim 12, wherein the brackets are bolted to the supports whereby the container is firmly attached to the mechanically stable housing.

14. Housing as claimed claim 1, further comprising an arched screen located on an inward pointing side of the container cover and positioned to protrude over an edge of the cylindrical member.

15. Housing as claimed in claim 1, wherein the telecommunication devices are unit carriers and the unit carriers are suspended on a wall of the cylindrical member.

16. Housing as claimed in claim 1, wherein:

(a) the container cover is made of plastic and has several ribs extending concentrically to each other;

(b) the container cover has several ribs extending radially, (c) a locking ring is bolted to the container cover, the locking ring is made of plastic and has several ribs extending concentrically to each other, and (d) the locking ring has several ribs extending radially.

17. Housing as claimed in claim 16, wherein the ribs in the container cover are on an inward side facing the container.

18. Housing as claimed in claim 16, wherein the respectively concentrically and radially extending ribs on the container cover face the locking ring.

19. Housing as claimed in claim 16, wherein the ribs in locking ring face the container cover.

20. Housing as claimed in claim 16, further comprising a screw bolt passing through a central bore in the locking ring is threadingly received in a fixed bolt bushing located in a center portion of the container cover.

21. Housing as claimed in claim 16, further comprising a sealing valve in the container cover and extending through an opening in the locking ring.

22. Housing as claimed in claim 16, wherein the concentric ribs in locking ring decrease in height from an outside portion to an inside portion of the locking ring whereby the cover presses against the concentric ribs of the locking ring in a tensed condition.

23. Housing as claimed in claim 1, wherein the container has several reinforcing ribs on its external surface, the reinforcing ribs are distributed around its circumference and extend in a longitudinal direction of the container.

24. Housing as claimed in claim 23, wherein the reinforcing ribs decrease in height from a rim of the container to a bottom portion thereof.

* * * * *